United States Patent
Appel et al.

(10) Patent No.: US 6,189,473 B1
(45) Date of Patent: Feb. 20, 2001

(54) CONTOUR-FOLLOWING APPARATUS FOR CLEANING SURFACES

(75) Inventors: D. Keith Appel, Aiken, SC (US); Steven L. Eckstein, Columbia, MO (US)

(73) Assignee: Remote Tools, Inc., Irmo, SC (US)

( * ) Notice: Under 35 U.S.C. 154(b), the term of this patent shall be extended for 0 days.

(21) Appl. No.: 09/255,138

(22) Filed: Feb. 22, 1999

Related U.S. Application Data

(60) Provisional application No. 60/075,593, filed on Feb. 23, 1998.

(51) Int. Cl.[7] .................................................... B63B 59/00
(52) U.S. Cl. ............................................... 114/222
(58) Field of Search ............................................. 114/222

(56) References Cited

U.S. PATENT DOCUMENTS

| | | |
|---|---|---|
| 3,623,902 | 11/1971 | Hammelmann . |
| 3,705,565 | 12/1972 | Hammelmann . |
| 3,800,732 * | 4/1974 | Hill .................................... 114/222 |
| 3,911,849 * | 10/1975 | Hammelmann ...................... 114/222 |
| 4,294,188 | 10/1981 | Ashworth . |
| 4,734,954 * | 4/1988 | Greskovics et al. ................. 114/222 |
| 5,138,800 | 8/1992 | Janusz . |
| 5,540,172 | 7/1996 | Goldbach et al. . |
| 5,628,271 | 5/1997 | McGuire . |
| 5,839,532 * | 11/1998 | Yoshiji et al. ....................... 114/222 |

FOREIGN PATENT DOCUMENTS

| | | |
|---|---|---|
| 2 113 080 | 1/1982 | (GB) . |
| 299140 | 2/1974 | (SU) . |

* cited by examiner

*Primary Examiner*—Stephen Avila
(74) *Attorney, Agent, or Firm*—Maria Reichmanis

(57) ABSTRACT

A modular apparatus for supporting and guiding a tool such as an ultra-high pressure water jet along a work surface, including a contour following assembly attached to a motorized lift vehicle. The contour following assembly includes a gimbals assembly with an instrument or tool carriage assembly, a positioning assembly that urges the gimbals assembly and the instrument carriage against the surface, and, optionally, a hydraulic, mechanical, or pneumatic pressure system that applies pressure to the positioning assembly. A scissors lift, hydraulic lift, telescoping arm, or other suitable device raises and lowers the apparatus. In operation, the gimbals assembly and the positioning assembly cooperate to maintain the instrument carriage in a user-selected position with respect to a work surface such as a ship hull, aircraft fuselage, storage tank, or the like. Depending on the type of tool selected, the apparatus may be used for cleaning or stripping surface coatings, buffing, painting, washing, and so forth. The apparatus is mobile, compact, cost-effective, and can be operated by a single operator.

20 Claims, 4 Drawing Sheets

CONTOUR-FOLLOWING APPARATUS FOR CLEANING SURFACES

This application claims the benefit of Provisional Application 60/075,593 filed Feb. 23, 1998.

BACKGROUND OF THE INVENTION

1. Field of the Invention

The present invention relates to an apparatus for working on the surfaces of ship hulls, aircraft fuselages, barges, storage tanks, and the like. In particular, the present invention relates to a contour-following apparatus for supporting and guiding tools such as ultra-high pressure water sprayers, sand and grit blasters, paint sprayers, and lasers.

2. Discussion of Background

The shipping industry is a vital and growing part of the global economy. At least 25,000 oceangoing vessels of weight 1,000 gross tons or more are presently in operation (this estimate does not include vessels that operate exclusively on inland waterways, military vessels, and special-purpose vessels such as icebreakers and cable ships. (The terms "ship" and "vessel" are used herein to refer to all watercraft, including boats, barges, tankers, cargo ships, freighters, cruisers, container ships, submarines, tankers, supertankers, aircraft carriers, and so forth.)

The external surfaces of ship hulls are generally treated with coatings containing anti-fouling agents and rust preventatives to inhibit marine growth and minimize corrosion. However, even the most durable coatings eventually deteriorate and must be replaced to prevent corrosion of the hull.

Protective coatings also help preserve the smoothness of a submerged surface. In general, the smoother the surface of any submerged portion of a ship (such as the hull or the propeller blades), the greater the fuel efficiency and the speed of the vessel. Roughness caused by barnacles and other marine growth, degradation of hull coatings, and deterioration of propeller surfaces can adversely affect the performance of the ship. Fouling also affects the hull coating material, eventually leading to corrosion and metal fatigue. Corrosion damage can result in expensive repairs, downtime, and, in severe cases, to premature scrapping of the ship.

In order to forestall these deleterious effects, the outer surfaces of ship hulls are cleaned periodically in dry dock to remove old coating material (including paint), corrosion, and marine growth, and new coatings are applied. (As used herein, the terms "cleaning" and "stripping" refer to removal of old paint and other coatings, corrosion, etc. from the surface of a ship hull or other surface.) In general, the cleaner and smoother the hull surface after cleaning, the longer-lasting and more effective the new coating. Thus, effective removal of old coatings, corrosion, and marine growth not only extends the lifetime of the new coating but reduces future maintenance expenses and resulting downtime. These maintenance questions are also a concern for aircraft and storage tanks, which also have exposed surfaces that are treated with corrosion-resistant or weather-resistant coatings.

A number of different techniques are used to clean ship hulls. Perhaps the most prevalent technique involves the use of sand blasting or grit blasting to remove paint, corrosion, and marine growth from the hull and expose the bare steel for the application of new coatings. Although sand blasting is widely used, it has several disadvantages including abrasion to the skin of the personnel performing the blasting, an increase in the amount of materials which must be recovered and disposed of, and undesired metallurgical changes to the steel surface being impacted by the silica particles.

Another technique that is rapidly gaining popularity is the use of ultra-high pressure water. Large compressors are used to generate pressures up to 60,000 psi to force the water through small orifices located close to the metal surface to be cleaned. The kinetic energy of the water at those elevated pressures is adequate to remove substantially all marine growth, paint and primer down to bare metal. Unlike sand blasting or grit blasting, this technique does not generate abrasive projectiles, there is no increase in the amount of materials to dispose of, and there are no metallurgical changes to the steel surfaces being cleaned.

Cleaning can be accomplished by manual or automated techniques. Manual cleaning is both dangerous and time consuming: the operators must work by hand with ultra-high pressure water jet wands that can produce thrusts as high as 50 pounds. The kinetic energy of the ultra-high pressure water can easily cut and lacerate human flesh, making the hand-held wands very dangerous to use. To access all the surfaces of a ship that may need to be cleaned, the operator of a water jet must either crouch underneath the hull or be supported by scaffolding or a boom-operated basket to access the sides of the ship. The efficiency of surface cleaning varies from person to person based on the techniques and equipment used: a four-person crew can average about 60 square feet per hour with manual equipment; a two-person crew can clean as much as 250 square feet per hour with automated equipment. Therefore, many dry dock operators prefer remote-controlled apparatus that allows the user to direct the position and movement of the cleaning head.

While most of the surface of a ship hull is approximately flat, the overall shape of the hull is composed of three-dimensional contours. These contours are predominant in the bow, stern and bottom. Any useful remote-controlled cleaning apparatus must accommodate this curvature, for example, by allowing the user to tilt an instrument carriage to maintain approximately uniform spacing between the carriage and the particular area of the hull being worked on.

Presently-available apparatus for cleaning hulls includes a mobile carrier disclosed by Goldbach, et al. (U.S. Pat. No. 5,540,172). The carrier, which has four sloping, adjustable-length legs, supports an abrasive blaster which is movable along a pair of rails having limit switches at both ends. The rail end connections are somewhat articulatable, thereby allowing the user to adjust the positions of the rails to the orientation and curvature of the hull by adjusting the lengths of the legs. A control panel allows the operator to control movement of the blaster and the carrier, spraying of abrasive, and for extending and retracting the legs to conform the positions of the rail ends to the bottom of the ship hull.

Janusz (U.S. Pat. No. 5,138,800) discloses a positioning apparatus for working on an airplane fuselage. The apparatus is attached to a guide frame, which is attached to a wheeled base by pivotal telescopic couplings that permit each side arm of the frame to be adjusted axially and pivotally via a motorized rack and pinion system, independently of the other arm, in parallel vertical planes. An axially-displaceable transverse guide beam which is attached to the side arms carries a telescoping tool carriage. The apparatus can be used with paint stripping tool having a head with a ribbon seal, proximity sensors, and a gravity load equalizing adapter. During operation of the apparatus, the proximity sensors provide continuous feedback concerning the position of the head with respect to the fuselage.

Ashworth's apparatus, described in U.S. Pat. No. 4,294,188, includes a vehicle that carries an articulated, rotatable, hydraulically-actuated boom structure resembling those commonly found on fire trucks and power line maintenance equipment. A cage is pivotally connected to the outermost end of the upper boom; a frame, carrying rollers, is pivotally connected to the cage. In operation, the hydraulic system biases the turntable so as to maintain engagement between the rollers and the work surface. McGuire's hull-cleaning apparatus (U.S. Pat. No. 5,628,271) includes a steered, motorized vehicle that carries a high-pressure sprayer. The vehicle is supported on the surface of a ship hull by the adhesion force of a permanent magnet.

In U.S. Pat. No. 3,705,565, Hammelmann shows an apparatus that includes a telescoping mast mounted to a turntable and an evacuable container pivotably mounted to the upper end of the mast. The container, which has an open side with sealing rollers facing the work surface, contains two spray nozzles used for treating the surface (the sealing rollers constitute a support for accommodating the unevennesses of the surface). The container itself slides on a pair of guide rods which are mounted to the mast by ball bearing assemblies. The apparatus includes a hydraulic cylinder for tilting the mast. In U.S. Pat. No. 3,623,902, Hammelmann describes an apparatus that includes several hydraulic cylinders and a transverse jib that compensates for the reaction force acting upon the nozzle when water is ejected at high pressure, thereby helping ensure constant spacing of the work station from the surface being treated. A feeler actuates the drive which effects tilting of the mast, which is accomplished by another hydraulic cylinder.

Matsuno, et al. (GB No. 2,113,080) provide an apparatus having a pipe with a plurality of jet nozzles mounted to a wheeled support frame (a "parallelogrammic frame" with four side pieces rotatably connected to one another at the four corners). The pipe can be rotated and moved towards/away from the work surface by means of a series of hydraulic actuators. The Zauralov, et al. apparatus (SU No. 299,140) includes a tool-carrying head mounted to a parallelogram-manipulator platform. The platform, which is attached to a pair of pivotable arms, can be raised and lowered, or rocked about an axis, by hydraulic cylinders.

Vehicles that can move an instrument carriage both horizontally and vertically are satisfactory for many applications, including cleaning large, approximately planar areas of ship hulls, aircraft fuselages, storage tanks, and so forth. However, these types of apparatus are less useful for cleaning curved areas such as the bow, stern, and bottom of a ship, the bottom of an aircraft fuselage, or the walls of a storage tank, where effective cleaning depends on the ability to follow the surface contour. Furthermore, a ship is supported in dry dock by support blocks with (typically) only a five to six foot clearance underneath; aircraft may be even closer to the ground. Any useful vehicle must have a sufficiently low profile to access such confined spaces. Therefore, many dry docks and aircraft maintenance facilities still resort to costly, potentially-dangerous manual cleaning techniques for at least part of the surface maintenance process.

There is a need for a simple, reliable, low-profile, remotely-controllable, contour-following apparatus for cleaning ship hulls, aircraft fuselages, storage tanks, and like structures. Such an apparatus should be made with readily-available, modular components, be straightforward to operate, and have a profile that allows its user to access bottom surfaces and curved surfaces of hulls.

SUMMARY OF THE INVENTION

According to its major aspects and broadly stated, the present invention consists of a modular, contour-following apparatus for supporting and guiding a tool along a surface. The apparatus, which is mounted to a motorized vehicle, includes a gimbals assembly with an instrument or tool carriage, a positioning assembly that urges the gimbals assembly and the instrument carriage against the work surface, a hydraulic, mechanical, or pneumatic pressure system that applies pressure to the positioning assembly, and a scissors lift, hydraulic lift, telescoping arm, or other suitable device for raising and lowering the apparatus. The apparatus can support a variety of tools useful for working on the surfaces of ship hulls, aircraft fuselages, storage tanks, and like vessels, including but not limited to ultra-high pressure water jets, sand blasters, grit blasters, laser stripping apparatus, and sprayers for applying surface coatings such as paint.

In operation, the gimbals assembly, the positioning assembly, and the vehicle cooperate to maintain the instrument carriage in a user-selected position with respect to a work surface. The lift allows the user to position the instrument carriage between a minimum height and a maximum height that depend on the particular selection of vehicle and lift. For example, an apparatus that allows the user to position the instrument carriage between a minimum height of approximately five feet and a maximum of approximately twenty feet is useful for accessing the bottoms and sides of ships in most dry docks; different ranges may be useful for other applications such as working on aircraft or storage tanks. Depending on the type of tool attached to the instrument carriage, the apparatus may be used for cleaning or stripping surface coatings, buffing, painting, or washing. It is mobile, compact, cost-effective, and can be operated by a single operator.

The contour following assembly formed by the instrument carriage, the gimbals assembly, and the positioning assembly is a major feature of the present invention. The contour following assembly positions the instrument carriage optimally with respect to the work surface, even in the case of difficult-to-access bottom surfaces and curved surfaces. The gimbals assembly allows the instrument carriage to pivot into alignment with the surface (i.e., approximately parallel to the surface) and follow the surface contour, while the positioning assembly gently urges the instrument carriage towards the surface. (As used herein, "to contact a surface," "in contact with a surface," "engaging the surface," and like expressions include situations wherein the instrument carriage is close to, but not actually touching the surface, as well as situations where it is touching the surface.) Thus, the gimbals assembly and the positioning assembly cooperate to maintain the instrument carriage in engagement with the surface. If desired, skids may be mounted to the forward end of the instrument carriage in order to maintain a pre-selected distance between the carriage itself and the work surface.

The gimbals assembly with the instrument carriage is an important feature of the present invention. The gimbals assembly has two pivots located on the perimeter of the instrument carriage. For optimum cleaning efficiency, the instrument carriage is preferably maintained approximately parallel to, and in contact with, the work surface. The locations of the pivots ensure that the instrument carriage always remains normally in contact with the work surface, whether that surface is planar or curved. In addition, the pivots allow the instrument carriage to pivot independently about two orthogonal axes, thereby furthering alignment with the work surface. Since the instrument carriage is freely pivotable, neither operator interaction nor computer control is needed to keep it properly aligned with the work surface.

As noted above, the instrument carriage can support a variety of tools useful for maintaining the surfaces of ships, aircraft, and storage tanks. For effective cleaning, devices such as water jets are generally mounted to the instrument carriage such that the high-pressure water stream is directed approximately normal to the work surface; however, tangential streams may also be useful for some applications.

Another important feature of the present invention is the dynamically balanced positioning assembly, which in a preferred embodiment of the invention includes a hydraulic, mechanical, or pneumatic pressure system that gently urges the gimbals assembly and instrument carriage into engagement with the work surface. The positioning assembly also includes a base, a shoulder weldment with arms that support the gimbals assembly, and a suitable power unit for supplying fluid to the piston of the hydraulic or pneumatic pressure system (if present). The configuration of these components is preferably such that a nearly constant force is applied to the instrument carriage in the gimbals assembly over the range of motion of the positioning assembly, thereby gently urging the instrument carriage assembly into engagement with the surface to be cleaned.

Another feature of the present invention is the use of a pressure relief valve or a pressure reducing/relieving valve in the hydraulic or pneumatic circuit of the positioning assembly to allow flow of fluid in and out of the piston at an approximately constant pressure. With this feature, the relief pressure is adjusted just once—at the start of work on any particular surface—to provide optimum pressure to meet the requirements of the instrument carriage and the surface. Once adjusted, the contour following assembly maintains the instrument carriage in contact with the surface, overcomes gravity forces from the instrument carriage and other components of the apparatus, overcomes thrust forces, and applies a nearly constant contact force between the instrument carriage and the work surface. No other action by the operator (or computer control system, if present) is needed.

Still another feature of the present assembly is the swivel base of the positioning assembly. The positioning assembly is pivotable about a vertical axis to allow movement to different sides of the delivery vehicle. This features allows placement of the instrument carriage up against the ship's support blocks without interference from the delivery vehicle.

Yet another feature of the present invention is its modular construction and its ease of disassembly/reassembly. The major components of the apparatus, including the contour following assembly, are attached to each other with clevis pins and retainer pins which can readily be removed without the use of special tools. The contour following assembly can thereby be readily dismantled into individual weldments, carried to another location, and as readily reassembled for use. This feature also reduces down-time of the apparatus, since individual components that are removed for repairs or servicing can be easily replaced.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
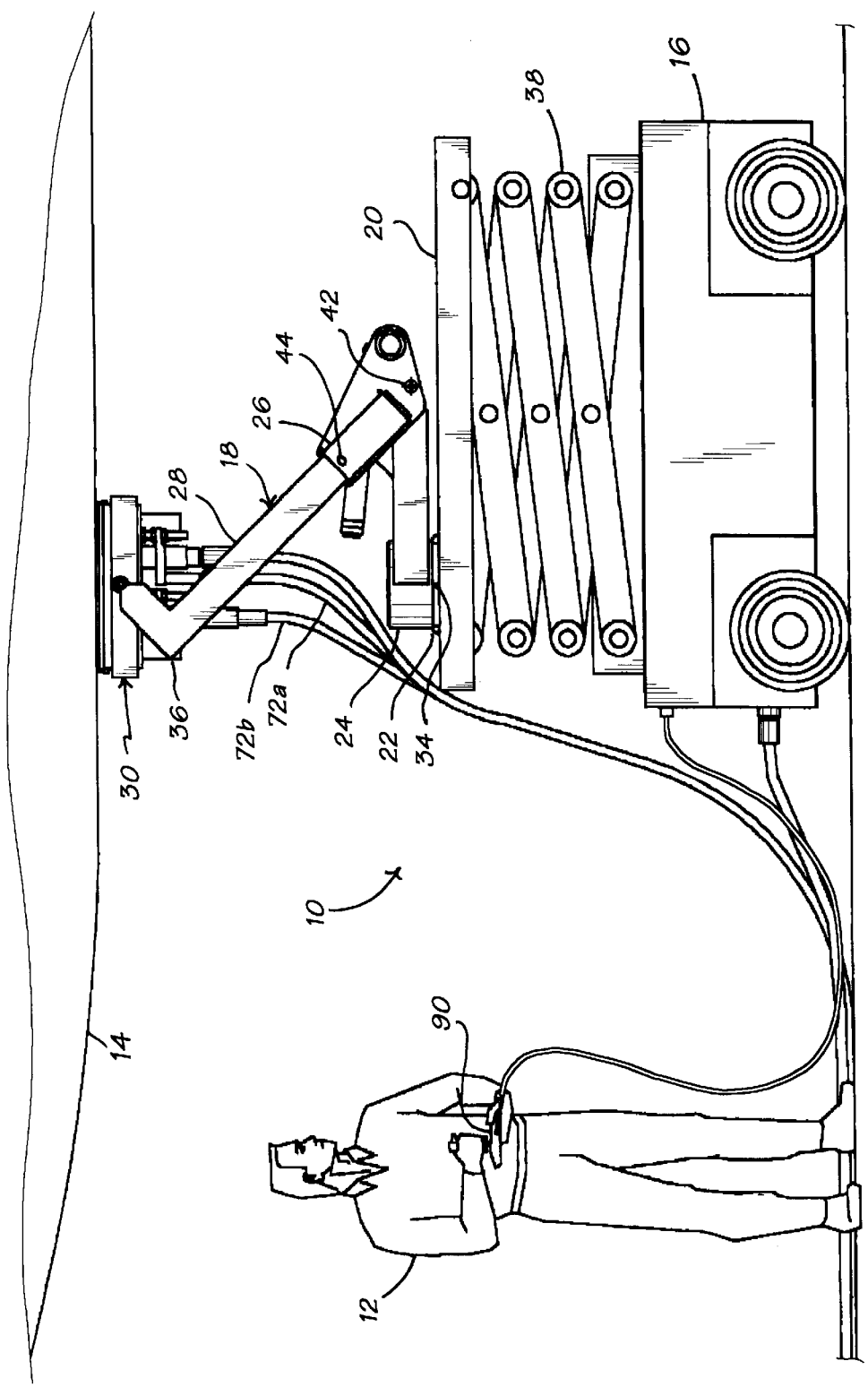
FIG. 1 is a side view of an apparatus according to a preferred embodiment of the present invention, showing the apparatus being used to clean the bottom of a ship hull.

In the following detailed description, reference numerals are used to identify structural elements, portions of elements, surfaces and areas in the drawings. It should be understood that like reference numerals are intended to identify the same structural elements, portions or surfaces consistently throughout the several drawing figures, as such elements, portions or surfaces may be further described or explained by the entire written specification. As used in the following description, the terms "horizontal," "vertical," "left," right," "up," "down," as well as adjectival and adverbial derivatives thereof (e.g., "horizontally," "rightwardly," "upwardly," etc.) refer to the relative orientation of the illustrated structure as the particular drawing figure faces the reader. Similarly, the terms "inwardly" and "outwardly" refer to the orientation of a surface of revolution relative to its axis.

Figure 2:
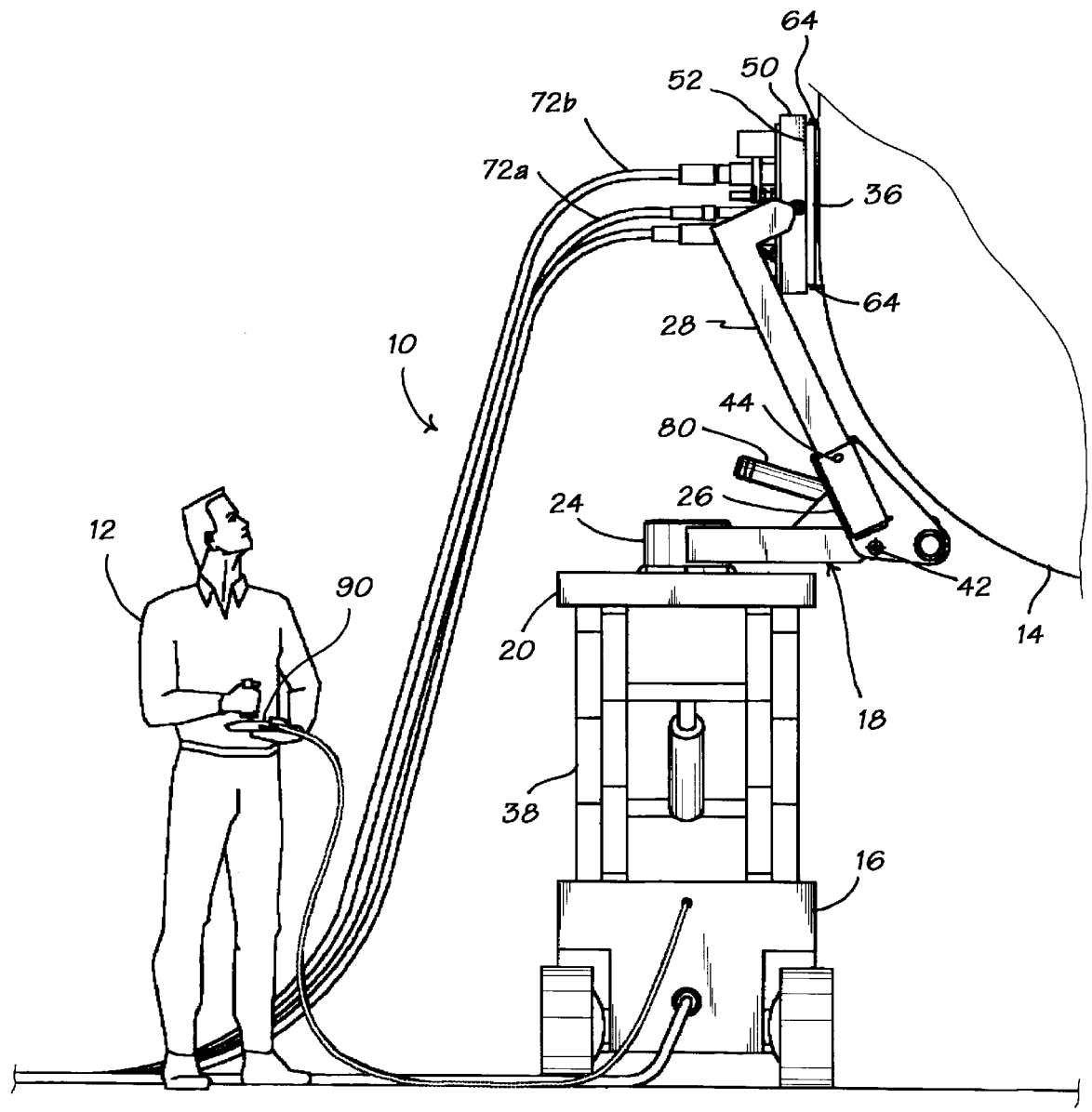
FIG. 2 shows the apparatus of FIG. 1 positioned for cleaning the side of a ship hull.

Referring now to FIGS. 1 and 2, there is shown a modular, contour-following apparatus 10 according to a preferred embodiment of the present invention. Apparatus 10 is shown as being used by an operator 12 to clean a ship hull 14; however, it will be understood that the apparatus may also be used to apply paint or other coatings to a work surface. Apparatus 10 may, of course, be used for work on other structures (aircraft fuselages, storage tanks, etc.).

Apparatus 10 includes a motorized vehicle 16 to which is mounted a contour following assembly 18. Assembly 18, which may be mounted to a platform 20 on vehicle 16, includes a base weldment 22, a swivel weldment 24, a shoulder weldment 26, an arm weldment 28, a gimbals assembly 30, and tool or instrument carriage assembly 32 (shown in FIGS. 3 and 4). As used herein, the term "weldment" refers to an assembly or structure whose component parts are joined together by welding to form a one-piece, unitary structure. However, while this type of structure is preferred, it should be understood that other techniques may also be used to form the above-mentioned components of apparatus 10 without departing from the spirit of the present invention.

Base weldment 22 is attached to the top of vehicle 16, either to a platform 20 as shown in FIGS. 1 and 2, directly to vehicle 16, or some other configuration if convenient. Swivel weldment 24 is rotatable about a pivot point 34 and can locked into a selected position with a plurality of fasteners (not shown). In a preferred embodiment of the invention, swivel weldment 24 is rotatable through at least 1800° in the forward direction of movement of vehicle 16; however, other degrees of rotation may also be useful for the practice of the invention. Shoulder weldment 26 is rotatable about a pivot point 42 and is attached to swivel weldment 24 by clevis pins or other suitable connectors. Arm weldment 28 is secured to shoulder weldment 26 by clevis pins or other suitable connectors. Gimbals assembly 30 is rotatable about a pivot point 36 and is attached to arm weldment 28 by clevis pins or other suitable connectors. Instrument carriage assembly 32 is secured to gimbals assembly 30 with a plurality of fasteners of any suitable type.

Motorized vehicle 16 preferably includes a scissors lift 38 or other suitable mechanism for raising and lowering contour following assembly 18. Vehicle 16 (including lift 38) is preferably AC-powered to facilitate continuous operation of apparatus 10; however, DC power (including battery power), hydraulic power, or pneumatic power may also be useful. If desired, lift 38 may be computer-controllable to lock out unsafe movements under a variety of pre-defined and user-definable, programmable conditions.

Figure 3:
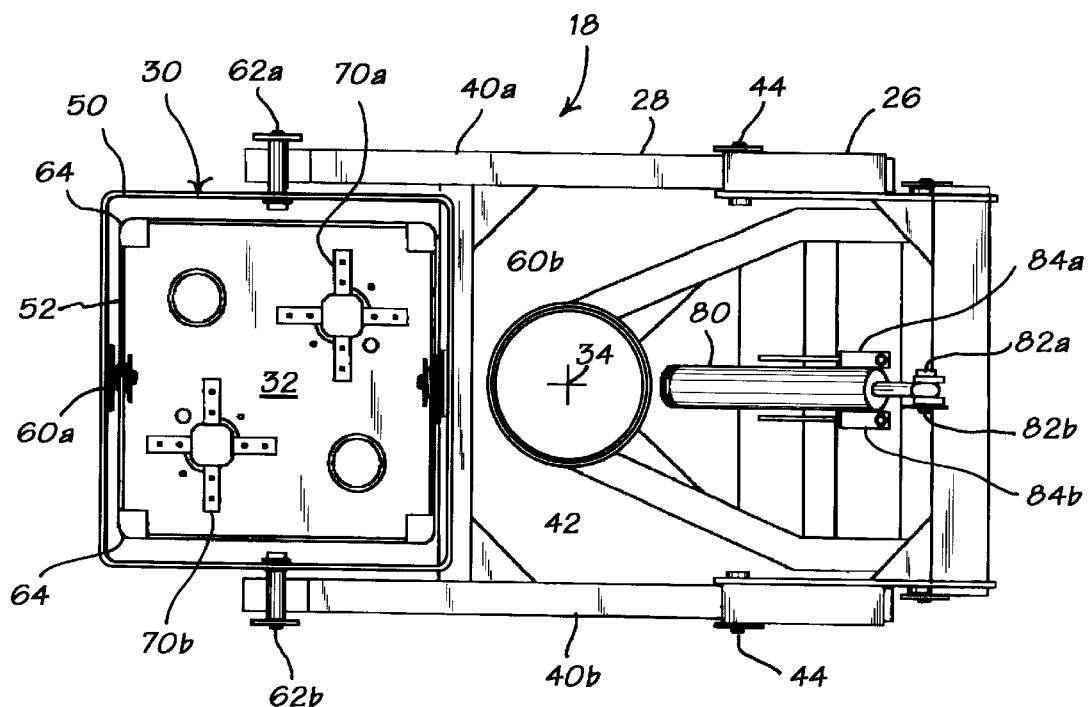
FIG. 3 is a top plan view of the contour following assembly of FIGS. 1 and 2, showing the instrument carriage assembly and the gimbals assembly.
Figure 4:
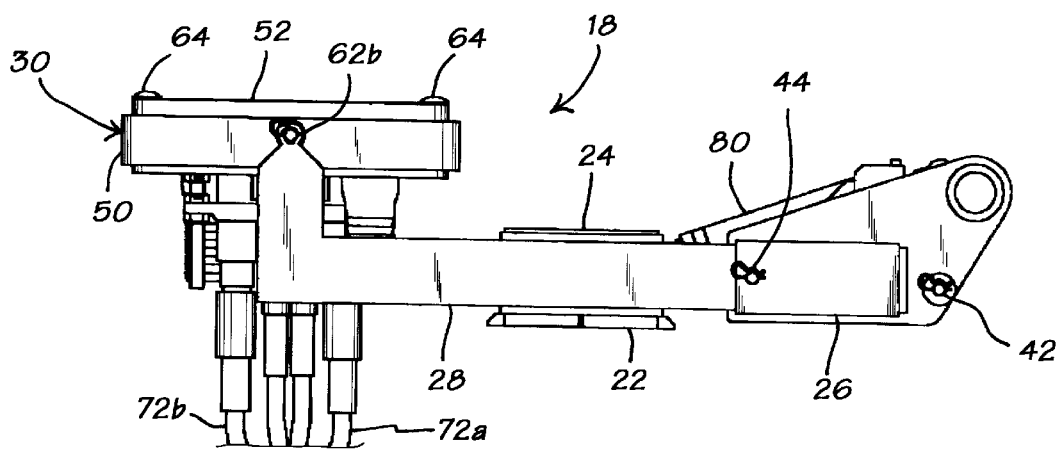
FIG. 4 is a side view of the contour following assembly of FIG. 3.

As best seen in FIGS. 3 and 4, a hydraulic or pneumatic piston 80 is attached between swivel weldment 24 and shoulder weldment 26, precisely positioned to balance gimbals assembly 30 and instrument carriage 32 (and tools mounted thereto) and provide a near-constant resultant force at the instrument carriage. The resulting mechanism approximately overcomes the weight of contour following assembly 18, the weight of instrument carriage 32, and the thrust loads generated by tools and other components mounted to instrument carriage 32. Thus, the components of apparatus 10 form a dynamically balanced system that maintains an approximately constant contact force between instrument carriage assembly 32 and the work surface.

Arm weldment 28 preferably includes two spaced-apart arms 40a, 40b, preferably braced by one or more members 42 to provide added stability. The rearward ends of arms 40a, 40b are attached to shoulder weldment 26 by quick-release pins 44; shoulder weldment 26 in turn is attached to swivel weldment 24 by quick-release pins. Quick-release pins such as clevis pins are preferred for attaching weldments together to aid in quick assembly/disassembly; however other types of fastener may also be useful.

As best seen in FIG. 3, gimbals assembly 30 includes an outer frame 50 and an inner frame 52. Frames 50, 52 are shown as being approximately square, but may be rectangular or indeed any other convenient shape and dimensions. Frames 50, 52 are pivotably connected to each other by pins 60a, 60b; outer frame 50 is pivotably connected to the forward ends of arms 40a, 40b by pins 62a, 62b. In combination, connectors 60a, 60b, 62a, 62b form two generally orthogonal pivots that allow instrument carriage assembly 32 to follow the contour of a ship hull or other work surface. Pins 62a, 62b are preferably quick-release pins such as clevis pins that allow for easy removal/replacement of assembly 32. Hardened steel skids 64 may be secured with suitable fasteners in each of the four corners of inner frame 52. Skids 64 provide low friction and long-lasting movements against the surface being cleaned. Of course, skids 64 may be made of any suitable materials; the shape and location of the skids 64 may be varied depending on the condition of the surface (s) to be cleaned with apparatus 10. If desired, skids 64 may be replaced or supplemented by rollers or casters.

A tool or tools for working on the surface of ship 14 (or indeed, any other work surface) is attached to instrument carriage assembly 32 by any suitable means. Suitable tools for use with apparatus 10 include ultra-high pressure water jets, buffers, sand or grit blasters, paint sprayers, laser cleaning units, and so forth. By way of example, apparatus 10 may include twin water jets 70a, 70b with associated hoses and fittings, represented schematically as 72a, 72b. Hoses 72a, 72b are connected to a source of water (not shown) when apparatus 10 is in use. As will be evident to those skilled in the art, vehicle 16 may contain pumps, motors, filtration devices, and other equipment that may be usable with the invention.

As noted above, contour following assembly 18 includes a hydraulic or pneumatic cylinder 80 attached by quick-release pins 82a, 82b, 84a, 84b (FIG. 3). Cylinder 80 is precisely positioned and balanced to overcome the weight and thrust load of instrument carriage assembly 32 and any tool or tools attached to the assembly. Cylinder 80, preferably a trunnion mount cylinder, also maintains an additional contact force to gently urge gimbals assembly 30 and instrument carriage 32 into engagement with the work surface. In addition, hydraulic damping in cylinder 80 tends to slow down the movement of gimbals assembly 30, thereby helping prevent slamming of instrument carriage assembly 32 (and any tools carried by instrument carriage assembly 32) into the work surface.

The optimum pressure exerted by cylinder 80 depends on the combined weight of instrument carriage assembly 32 and gimbals assembly 30, the tools (such as water jets 70a, 70b) attached to assembly 32, and other components of contour following assembly 18 such as arms 40a, 40b. For example, if the thrust load of this combined weight is approximately 100 lbs., cylinder 80 preferably maintains an additional 20–40 lbs. of contact force. However, the optimum amount of contact force depends on the size, weight, and relative positions of the various components of apparatus 10, and is best determined by a modest amount of experimentation and observation for each particular combination of components. In operation, the amount of surface contact force may be adjusted by adjusting the pressure supplied to cylinder 80.

Above-described apparatus 10 with contour following assembly 18 is mobile and modular, and can readily be adapted for use with a variety of structural geometries. It will be evident that additional equipment, including but not limited to vacuum attachments for recovering materials removed from hull 14, may be added to apparatus 10.

With lift 38 lowered to a suitable height, apparatus 10 can be used to clean the underside of a ship hull, aircraft fuselage, or other structure (FIG. 1); with lift 38 raised, it can clean the side of the hull (FIG. 2). The optimum height of lift 38 depends, of course, on the location of apparatus 10 relative to the work surface, and the relative dimensions of the apparatus and the surface: the range of operation of apparatus 10 depends on the selection of components and their dimensions (vehicle 16, lift 38, arm weldment 28, etc.). For example, an operating range of approximately 5'–20' is useful for accessing the bottoms and sides of ships in most dry docks; different ranges may be useful for other applications such as cleaning the bottom of an aircraft fuselage or decontaminating storage tanks.

Apparatus 10 is modular, so that all of the major components of the apparatus—swivel weldment 24, shoulder weldment 26, arm weldment 28, gimbals assembly 30, instrument carriage assembly 32, cylinder 80—can quickly and easily be removed for repairs or replacement as may be needed. This feature also furthers adaptation of apparatus 10 to work on various structural geometries, since the dimensions, weight, and configuration of the components of the apparatus can be varied to address a particular application. Apparatus 10 and its components may be made of any suitable materials. It will be evident to those skilled in the art that the optimum dimensions, weight, materials, and configuration of apparatus 10 are best determined in view of the anticipated applications.

By way of example, the length of arms 40a, 40b of arm weldment 28 may be varied depending on the size of the structures to be treated. The overall size and weight of gimbals assembly 30 and instrument carriage 32 may vary depending on the sizes and weights of the tools to be used and the anticipated degree of curvature of the work surface (smaller assemblies 30, 32 may be useful for structures with relatively high degrees of curvature, larger assemblies 30, 32 for relatively flat structures). Indeed, the user of apparatus 10 may select a first gimbals assembly 30 (with instrument carriage 32 and suitable tools) for a task, then replace it with a second assembly 30 (with different tools) for another task.

Except for pivoting of swivel weldment 24 about pivot point 34, all positioning of vehicle 16 and contour following assembly 18 is accomplished remotely; thus, the operator may station himself in a suitable location and not risk injury due to high-pressure water spray, grit blasting, exposure to toxic wastes, etc. The low profile of apparatus 10 easily allows access to clean the bottoms of ships on standard five-foot blocks in dry dock (if needed, contour following assembly 18 may be mounted on vehicles suitable for accessing tighter spaces). Assembly 18 automatically stays in contact with the work surface even in transitions from vertical to horizontal, without the need for operator input or computer control.

In a preferred embodiment of the invention, all user-controllable functions of apparatus 10 (movement of vehicle 16, raising/lowering of arm weldment 26, operation of cylinder 80, operation of tools mounted to instrument carriage assembly 32, and so forth) are operated via a single control unit 90 (shown in FIGS. 1 and 2). Control unit 90, which may be a radio control unit or (as shown in FIG. 1) be hard-wired to vehicle 16 and apparatus 10, may easily be held in one hand and operated with the other hand. The unit may include controls such as "power on" and "power off" switches, a "kill" switch, dials, joysticks, or other suitable controls for operating contour following assembly 32, and such other controls as may be apparent to those skilled in the art. If desired, vehicle 16 may include suitably-positioned, user-controllable lights (not shown) to help illuminate the work surface.

Figure 5:
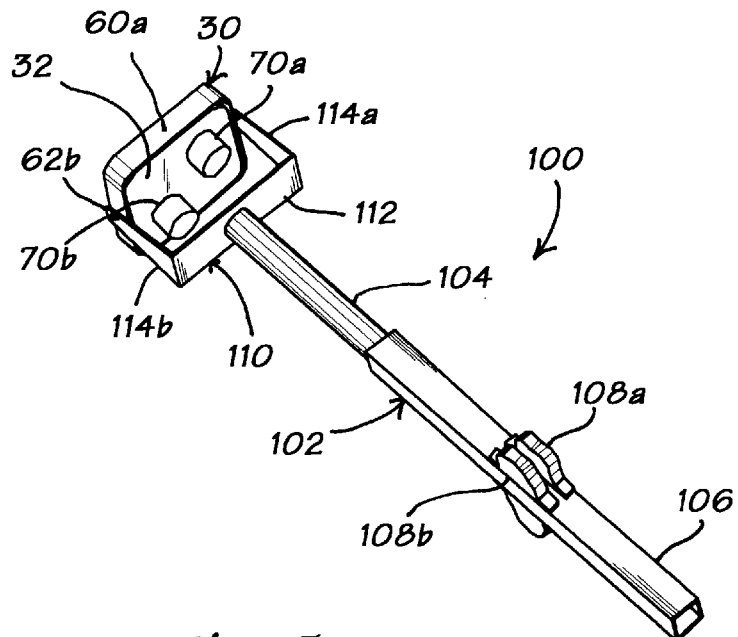
FIG. 5 is a rear perspective view of a positioning assembly according to another preferred embodiment of the present invention.
Figure 6:
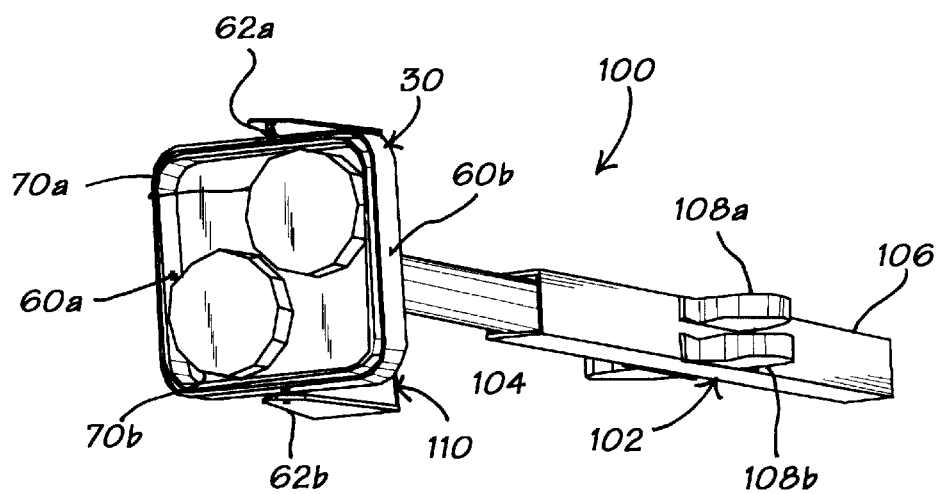
FIG. 6 is a front perspective view of the positioning assembly of FIG. 5.

Another contour following assembly 100 according to the present invention is shown in FIGS. 5 and 6. Assembly 100 includes a gimbals assembly 30 with a instrument carriage 32 and water jets (or other useful tools) 70a, 70b as described above. A positioning assembly 102 includes a base in the form of a rod 104 slidable in a sleeve 106, at least one spring assembly such as 108a, 108b operably connected to rod 104, and an arm 110 with a shoulder portion 112 and extensions 114a, 114b.

Assembly 102 is pivotably attached to gimbals assembly 30 by pins 62a, 62b. Pins 60a, 60b, 62a, 62b form two generally orthogonal pivots that allow instrument carriage assembly 32 to follow the contour of a work surface. Positioning assembly 102 is attached to a lift (such as above-described lift 38), a "cherry-picker"-type lift, or indeed any convenient platform for use.

In operation, spring assemblies 108a, 108b gently push rod 104 to urge instrument carriage 32 against the work surface. Spring assemblies 108a, 108b exert an approximately constant force that depends on the weight of instrument carriage 32, the weight of positioning assembly 102, and the thrust loads generated by tools and other devices mounted to carriage 32. Depending on the particular configuration of spring assemblies 108a, 108b, the assemblies also exert damping forces that help prevent slamming of gimbals assembly 30 (and any devices carried by instrument carriage 32) into the work surface. Alternatively, spring assemblies 108a, 108b may be replaced by any suitable hydraulic or pneumatic device that provides an approximately constant force for urging instrument carriage 32 against the work surface.

The dimensions of contour following assembly 100, like those of above-described assembly 18, may be varied depending on the anticipated size of the structures to be treated, the sizes and weights of the tools to be mounted to instrument carriage 32, and the degrees of curvature of the work surfaces. For example, smaller assemblies 100 may be useful for structures with relatively high degrees of curvature and/or smaller ground clearances, while larger assemblies 100 may be useful for relatively flat structures and/or larger ground clearances. When assembly 100 is in use, the operator can accomplish all positioning of the assembly remotely via a single control unit 90, without risking injury to high-pressure water spray, exposure to toxic wastes, etc.

All components of apparatus 10 are preferably made of sturdy, durable materials, including but not limited to stainless steel, carbon steel, aluminum, composite materials, and plastics and other polymers. Corrosion-resistant materials may be useful for an apparatus 10 intended for use in particularly harsh environments. If desired, exposed components such as arm weldment 28, frames 50, 52, rod 104, and sleeve 106 may be coated with weather-resistant coatings.

Apparatus 10 is mobile and modular, and can readily be adapted to treat a variety of structural geometries including but not limited to ship hulls, aircraft fuselages, storage tanks, and the like. A typical barge can be cleaned at one-sixth the cost with apparatus 10 as compared to conventional manual cleaning techniques.

The apparatus may be powered by standard line power (alternating current, AC power); alternatively, other power sources such as DC line power or replaceable, rechargeable battery packs, diesel and other internal combustion engines, and compressed air supplied via an extension hose may be useful.

While apparatus 10, with positioning assemblies 18 and 100 as described above, is most commonly operated from a vehicle such as vehicle 16, the apparatus may be mounted to a cherry picker or other type of overhead support mechanism if convenient. A wide variety of tools can be used with the apparatus, including but not limited to paint stripping, polishing, cleaning, washing, painting, and inspection tools for verifying the structural integrity of the work surface.

With respect to the above description of the invention, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention. Thus, it will be apparent to those skilled in the art that many changes and substitutions can be made to the preferred embodiment herein described without departing from the spirit and scope of the present invention as defined by the appended claims.

What is claimed is:

1. An apparatus for supporting and guiding a tool along a work surface, said apparatus comprising:

an instrument carriage assembly;

a dynamically balanced positioning assembly, said positioning assembly including means for urging said instrument carriage assembly into contact with said surface;

means for adjusting a relief pressure of said positioning assembly; and gimbal means for securing said instrument carriage assembly to said positioning assembly, said gimbal means allowing said instrument carriage assembly to pivot independently about two orthogonal axes so that, when said instrument carriage assembly is positioned at a selected orientation relative to said surface, said gimbal means and said positioning assembly cooperate to maintain said instrument carriage assembly in said selected orientation.

2. The apparatus as recited in claim 1, wherein said positioning assembly further comprises:

a shoulder portion; and an arm portion pivotably connected to said gimbal means.

3. The apparatus as recited in claim 1, wherein said positioning assembly further comprises:

a base;

a shoulder portion connected to said base; and an arm portion having a first end pivotably connected to said gimbal means and a second end pivotably connected to said shoulder portion.

4. The apparatus as recited in claim 1, wherein said positioning assembly further comprises:

a base;

a shoulder portion connected to said base;

an arm portion having a first end pivotably connected to said gimbal means and a second end connected to said shoulder portion; and means for urging said instrument carriage assembly into contact with said surface, said urging means operably connected to said base.

5. The apparatus as recited in claim 1, further comprising at least one tool carried by said instrument carriage assembly.

6. The apparatus as recited in claim 5, further comprising skid means mounted to a distal end of said instrument carriage assembly.

7. The apparatus as recited in claim 1, wherein said positioning assembly has a range of motion, and wherein said positioning assembly applies a nearly constant resultant force to said instrument carriage assembly over said range of motion.

8. An apparatus for supporting and guiding a tool along a stationary surface, said apparatus comprising:

a vehicle;

an instrument carriage assembly;

a positioning assembly attached to said vehicle, said positioning assembly including means for urging said instrument carriage assembly into contact with said surface, said urging means maintaining an approximately constant resultant force between said instrument carriage assembly and said surface;

means for adjusting a relief pressure of said positioning assembly; and gimbal means for securing said instrument carriage assembly to said positioning assembly, said gimbal means pivoting said instrument carriage assembly independently about two orthogonal axes so that, when said vehicle with said instrument carriage assembly is positioned so that said instrument carriage assembly is oriented approximately parallel to said surface, said gimbal means and said positioning assembly cooperate to maintain a position of said instrument carriage assembly relative to said surface.

9. The apparatus as recited in claim 8, wherein said positioning assembly further comprises:

a base;

a shoulder portion connected to said base;

an arm portion having a first end pivotably connected to said gimbal means and a second end connected to said shoulder portion.

10. The apparatus as recited in claim 8, wherein said urging means is selected from the group consisting of hydraulic cylinders, pneumatic cylinders, and springs.

11. The apparatus as recited in claim 8, further comprising at least one tool carried by said instrument carriage assembly.

12. The apparatus as recited in claim 8, further comprising user-operable means attached to said vehicle for raising and lowering said positioning assembly.

13. The apparatus as recited in claim 8, further comprising user-operable means for controlling operation of said positioning means.

14. The apparatus as recited in claim 8, further comprising waste material collecting means operably connected to said instrument carriage assembly.

15. The apparatus as recited in claim 8, wherein said positioning assembly has a range of motion, and wherein said positioning assembly applies a nearly constant resultant force to said instrument carriage assembly over said range of motion.

16. A device for supporting and guiding a tool along a stationary surface, said device comprising:

an instrument carriage assembly having a range of motion;

gimbal means connected to said instrument carriage assembly, said gimbal means allowing said instrument carriage assembly to pivot independently about two orthogonal axes so that, when said instrument carriage assembly is positioned at a selected location relative to said surface, said gimbal means maintains said instrument carriage assembly in approximate alignment with said surface;

means for applying a nearly constant force to said instrument carriage assembly over said range of motion, said force-applying means operably connected to said instrument carriage assembly; and means for adjusting said nearly constant force so that said instrument carriage assembly engages said surface, said adjusting means including means for adjusting a relief pressure thereof.

17. The apparatus as recited in claim 16, further comprising user-operable means attached to said vehicle for raising and lowering said instrument carriage assembly.

18. The device as recited in claim 16, further comprising at least one tool carried by said instrument carriage assembly.

19. The device as recited in claim 16, further comprising skid means mounted to a distal end of said instrument carriage assembly.

20. The device as recited in claim 16, wherein said gimbal means further comprises:

a first frame;

a second frame carrying said instrument carriage assembly, said second frame being inside said first frame and approximately coplanar therewith; and means for pivotably connecting said first and said second frames.

\* \* \* \* \*